Dec. 10, 1940.   J. N. MELCHER   2,224,740
AIR COOLING APPARATUS
Filed July 30, 1937
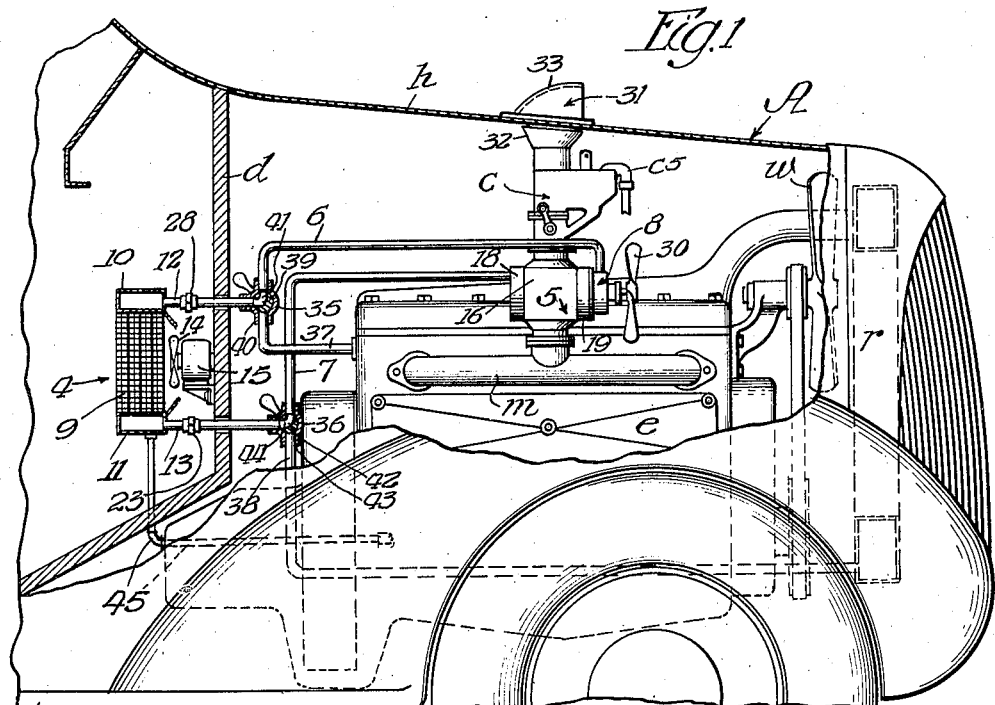
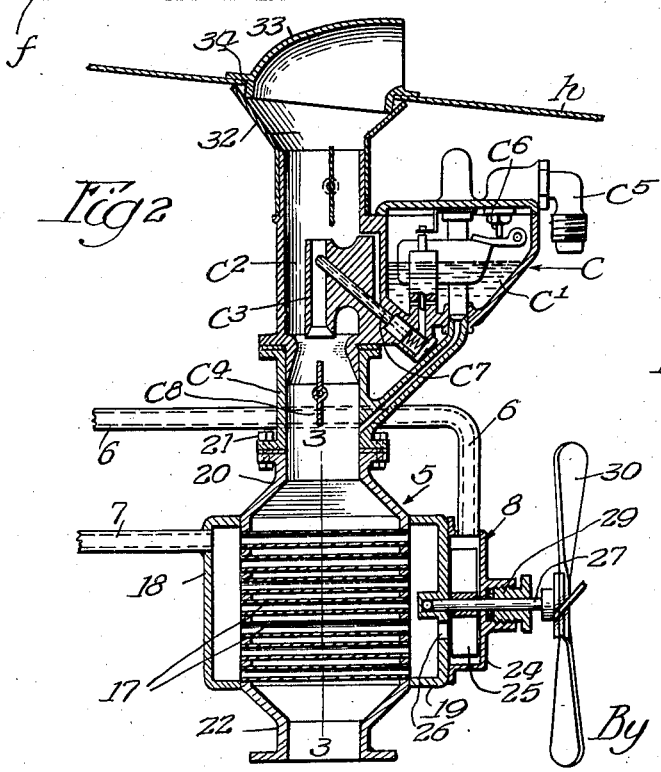
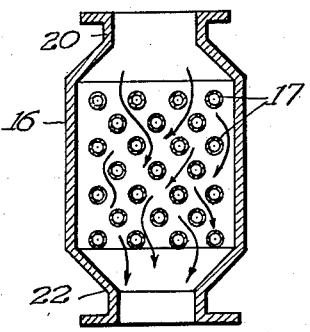
Inventor
John N. Melcher
By Thed Gerlach
his Atty Patented Dec. 10, 1940

2,224,740

UNITED STATES PATENT OFFICE 2,224,740

AIR COOLING APPARATUS

John N. Melcher, Waukesha, Wis.

Application July 30, 1937, Serial No. 156,475

3 Claims. (Cl. 62—169)

The present invention relates generally to apparatus for cooling air. More particularly the invention relates to that type of air cooling apparatus which is designed primarily for use with an automobile having an internal combustion engine as a propelling medium, and is adapted to cool the air in the body of the automobile so as to provide comfort for the driver and occupants during warm or hot weather.

One object of the invention is to provide an air cooling apparatus of this type which is extremely efficient in operation and so simple as far as design and construction are concerned that it may be manufactured at a low cost as well as quickly and readily installed.

Another object of the invention is to provide a cooling apparatus of the type under consideration which includes a heat exchange unit in the automobile body, a cooling device between the carburetor and intake manifold of the automobile engine, pipe connections between the device and the heat exchange unit, and pump means for circulating a cooling medium such as water so that it passes through the cooling device and then through the unit where it serves as the result of absorption of heat to cool the air within the automobile body.

Another object of the invention is to provide an apparatus of the last mentioned character in which the cooling device between the carburetor and intake manifold of the automobile engine comprises a duct for delivering the fuel from the carburetor to the intake manifold, and a group of tubes which extend transversely through the duct and are adapted to have the cooling medium pass therethrough and to be cooled as the result of the evaporative action of the fuel passing through the duct to the intake manifold.

A further object of the invention is to provide an air cooling apparatus of the type and character under consideration in which the pump means for circulating the cooling medium through the tubes of the cooling device and then through the heat transfer unit in the automobile body is driven in a novel manner and the pipe connections between the cooling device and the heat transfer unit include valves for cutting off the cooling device from the heat exchange unit and connecting the unit so that it is adapted to receive hot water from the water jacket of the engine and thus serves to heat the air in the body of the automobile during cold weather.

A still further object of the invention is to provide an air cooling apparatus which is generally of new and improved construction.

Other objects of the invention and the various advantages and characteristics of the present cooling apparatus will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a fragmentary, combined side elevational and sectional view of an automobile having applied thereto an air cooling apparatus embodying the invention;

Figure 2 is an enlarged vertical longitudinal sectional view of the cooling device of the apparatus illustrating in detail the arrangement and design of the duct and tubes and showing the manner in which the fuel passes downwardly from the carburetor to the duct and serves by its evaporative effect to cool the tubes together with the cooling medium passing through the latter; and Figure 3 is a vertical transverse sectional view of the cooling device of the apparatus taken on the line 3—3 of Figure 2.

The apparatus which is shown in the drawing constitutes the preferred embodiment of the invention and operates, as hereinafter described, to cool the air in the body of an automobile A. The latter is of standard or conventional design and comprises a wheel supported chassis frame $f$ with an internal combustion engine $e$ at the front end thereof. The engine serves as the propelling medium for the automobile and embodies an intake manifold $m$ at one side of the cylinder block thereof. A carburetor $c$ is located above the engine and serves to supply fuel to the intake manifold $m$. It is of the down draft variety and comprises a float chamber $c^1$, a vertically extending sleeve-like member $c^2$ at one side of the chamber, a downwardly extending nozzle $c^3$ in the sleeve-like member, and a discharge sleeve or member $c^4$ at the lower end of said sleeve-like member. Gasoline or other liquid fuel is delivered into the chamber $c^1$ by way of a delivery pipe $c^5$ under control of a valve $c^6$ which is opened and closed automatically by the float in the chamber $c^1$. A passage $c^7$ conducts gasoline from the chamber $c^1$ to the nozzle $c^3$. When the engine is in operation air enters the upper end of the discharge member $c^4$ as the result of suction in the intake manifold $m$ and vaporizes the gasoline emanating from the nozzle $c^3$. The mixture of air and gasoline vapor constitutes the fuel for the engine $e$ and flows downwards into the manifold $m$ via the member $c^4$. The latter embodies out-turned connecting flanges at its ends and has a throttle valve $c^8$ therein. The engine $e$ is surrounded or covered by a hood $h$ and embodies therearound a water jacket which is connected by suitable pipe connections to a radiator $r$ at the front end of the chassis frame $f$. Air is drawn through the radiator $r$ and forced rearwardly under pressure over the motor for cooling purposes by way of a fan wheel $w$ which is located behind the radiator and is connected by a belt and pulley connection for drive by the crank or cam shaft of the engine. The body of the automobile is located behind the hood $h$ and is separated from the latter by way of a dashboard $d$.

The cooling apparatus may be applied to the automobile either as standard equipment or an accessory and comprises a heat exchange unit 4, a cooling device 5, pipe connections 6 and 7, and a pump 8.

The heat exchange unit 4 is disposed in the body of the automobile A in close proximity to the dashboard $d$ and consists of a group of vertically extending fin-equipped tubes 9, and a pair of headers 10 and 11. The header 10 is connected to and communicates with the upper ends of the tubes 9 and has an inlet nipple 12. The header 11 extends horizontally across and is connected to the lower ends of the tubes and has an outlet nipple 13. Both nipples, as shown in Figure 1, extend forwardly in the direction of the dashboard $d$. The unit is filled with a cooling medium or liquid such as water and is connected to the cooling device 5 by the pipe connections 6 and 7 in such manner that when the pump is in operation the water flows from the header 11 to the cooling device via the pipe connection 7 and then by way of the pipe connection 6 back to the header 10 from whence it flows or circulates downwards through the tubes 9 to the header 11. The water is cooled as a result of flow through the device 5 and hence operates when circulated through the heat exhange unit 4 to cool the air in the automobile body by way of heat absorption. In order to circulate the air in the body of the automobile past the tubes 9 for cooling purposes, the unit 4 comprises in addition to the tubes and the headers a fan 14. This fan is located between the tubes and the dashboard $d$ and is driven by an electric motor 15. The latter is supported in any suitable manner and causes the fan 14 during drive thereof to draw air around the front portion of the unit, that is, the portion facing the dashboard $d$ and to force such air rearwards around the fin-equipped tubes 9. During rearward travel of the air from the pressure faces of the blades of the fan, the air strikes against the fin-equipped tubes 9 and loses its heat as a result of such contact.

The cooling device 5 operates as a condenser and consists of a vertically extending duct 16, a group of horizontally extending tubes 17, a header 18 and a header 19. The duct 14 is interposed between the carburetor and intake manifold of the engine $e$ of the automobile and is adapted to have the gaseous fuel drawn downwardly therethrough by way of the suction in the intake manifold $m$. It is rectangular in cross-section, as shown in Figures 2 and 3, and is of greater cross-sectional area than the discharge member $c^4$ at the lower end of the carburetor with the result that it operates as an expansion chamber for the fuel. The upper end of the duct 14 embodies a reduced or restricted flanged inlet 20 which, as shown in Figure 2, is connected by bolts 21 to the out-turned flange at the lower end of the member $c^4$. The lower end of the duct embodies a restricted flanged outlet 22 which fits against and is secured to a flanged inlet nipple on the central portion of the intake manifold $m$ of the engine $e$. The tubes 17 are spaced laterally from one another. They extend transversely across the central portion of the duct 14 and are preferably staggered so as in a measure to retard the downflow of fuel through the duct. The ends of the tubes at one side of the duct extend through holes in, and are welded or otherwise suitably secured to, said side and communicate with the header 18. The ends of the tubes at the opposite side of the duct extend through holes in, and are welded to, said opposite side and communicate with the header 19. The header 18 is suitably secured to the duct and is connected to receive water from the header 11 of the heat exchange unit by way of the pipe connection 7. The latter is connected at one end thereof to the outlet nipple 13 of the header 11 by a union 23. The other end of the pipe connection extends into and is connected to the upper end of the header 18. During operation of the pump 8 water flows from the header 11 through the outlet nipple 13 and the pipe connection 7 to the header 18 and then passes through the tubes 17 to the header 19. As the water passes through the tubes it is cooled as the result of the evaporative action of the fuel passing through the duct 16 and impinging directly against the tubes 17. By reason of the fact that the gaseous fuel in the duct 14 is under reduced pressure that is minus atmospheric pressure the liquid portion of the fuel evaporates with comparatively great rapidity and hence produces a high degree of cold. The header 19 is suitably secured to the duct 16 and supports or carries the pump 8. The latter, as shown in Figure 2, comprises a casing 24 and a rotor 25. The casing fits against the header 19 and is adapted to have water flow into the central portion thereof by way of a hole 26 in such header. The rotor 25 is mounted on a horizontally extending shaft 27 and is adapted when the shaft is driven, to pump the water through the casing and force it via the pipe connection 6 to the header 10 of the heat exchange device 4. Said pipe connection is connected at one end to the inlet member 12 by a union 28. The other end of the pipe connection 6 extends through and is connected to the upper portion of the casing 24 of the pump. The shaft 27 extends through and is journaled in a stuffing box 29 and is provided at the front end thereof with a fan wheel 30. The latter is aligned with the fan wheel $w$ and is adapted during operation of the engine and drive of said fan wheel $w$ to be driven or rotated by the air passing rearwards over the motor. When the pump 8 is in operation as a result of rotation of the fan wheel 30 by the air emanating from the fan wheel $w$, the water, after being cooled as the result of flow through the tubes 17 and the duct 16, flows into the header 19 and thence via the hole 26 into the central portion of the pump casing 24. From the central portion of the pump casing, the cooled water is forced outwards through the pipe connection 6 and the inlet nipple 12 to the header 10 and thence passes downwards through the tubes 9 and effects cooling of the latter.

As shown in Figures 1 and 2 of the drawing, the upper end of the sleeve-like member $c^2$ of the carburetor $c$ receives air by way of a sectional conduit 31. This conduit comprises an inner section 32 and an outer section 33, and is adapted to pick up or receive air outside of the hood $h$ for use in fuel vaporization. The inner section underlies the hood $h$ and is fixedly secured to the upper end of the member $c^2$. The outer section 33 is in the form of an elbow and extends through a hole 34 in the hood $h$. One branch of the elbow-like outer section 33 extends substantially horizontally and also in a forward direction so as to scoop the air that is encountered during forward travel of the automobile A and direct such air downwards through the section 32 into the sleeve-like member $c^2$ of the carburetor. The other branch of the outer section 33 of the conduit fits loosely in the upper end of the inner section 32 with the result that it is possible to raise the hood $h$ in connection with the repair or inspection of the engine $e$ without disturbing the inner section 32. By employing the sectional conduit 31 the carburetor $c$ receives at all times outside air which is normally at a lower temperature than engine heated air within the hood $h$ and hence the efficiency of the apparatus is materially increased.

In order that the heat exchange unit 4 may be utilized in winter to heat the air in the body of the automobile A instead of cooling it, a pair of two-way valves 35 and 36, and a pair of pipe connections 37 and 38 are provided. The two-way valve 35 is connected to the discharge end of the pipe connection 6 and comprises a plug 39 and a branch 40. The pipe connection 37 extends between the top of the water jacket of the engine $e$ and the branch 40. The plug 39 of the valve includes a port 41 and is adapted when in one position to have the port effect communication between the pipe connection 6 and the header 10 of the heat exchange unit and when shifted or turned 90° to cut off the pipe connection 6 and establish connection between the pipe connection 37 and the header 10. The two-way valve 36 is connected to the pipe connection 7 and comprises a rotatable plug 42 and a branch 43. The pipe connection 38 extends between the branch 43 and the lower portion of the radiator $r$. The plug 42 of the valve 36 includes a port 44 and is adapted when in one position to have the port thereof establish communication between the pipe connection 7 and the header 11 of the heat exchange unit and when turned or rotated 90° to cut off the pipe 7 and have the port thereof effect communication between the pipe 38 and said header 11. When the plugs of the two valves are open as far as the pipes 37 and 38 are concerned, the heat exchange unit 4 is cut off from the cooling device 5 but is connected to the water circulating cooling system of the engine and receives a flow of hot water therethrough. As a result of the passage of hot water through the coils 9 the air in the automobile body is heated. When the plugs of the valve are closed as far as the pipes 37 and 38 are concerned, the heat exchange device is cut off from the engine circulating or cooling system and is connected to the device 5.

With a view of maintaining the heat exchange unit 4, the cooling device 5, and the pipe connections 6 and 7 filled with water while the device 5 is in operation a small tube 45 is provided. This tube is connected at one end to the water jacket of the engine $e$ so as to receive water therefrom. The other end of the tube is connected to the header 11 of the unit 4. When the engine $e$ is in operation the pressure of the water in the jacket thereof is such that a small portion of the water goes into the pipe 45 and serves to fill the cooling apparatus. The tube 45 permits the water in the cooling apparatus to expand and in the event of contraction of the water in the apparatus allows water under pressure to flow from the water jacket of the engine into the unit 4.

When it is desired to cool the air in the automobile body A the plugs of the two-way valves 35 and 36 are shifted or turned so as to connect the heat exchange unit 4 to the cooling device 5. When the engine is in operation and is connected to propel forwardly the automobile A, air flows through the sectional conduit 31 and thence downwards through the sleeve-like member $c^2$ of the carburetor to the member $c^4$. During downward flow of the air past the nozzle $c^3$ of the carburetor $c$ the gasoline passing through the nozzle is vaporized and it together with the air constitutes a combustible mixture and flows downwards through the duct 16 to the intake manifold $m$ of the engine. As the mixture or fuel passes or flows around the tubes 17 it cools the tubes as the result of the evaporative action of the fuel. During operation of the automobile A the air emanating from the fan wheel $w$ impinges against the fan wheel 30 and causes the latter through the medium of the shaft 27 to drive the pump 8. During drive of the pump 8 the water in the cooling apparatus flows from the header 11 through the pipe 7 to the header 18 and thence through the tubes 17 to the header 19 and from the header 19 through the pump 8, the pipe connection 6, to the header 10, from whence it flows or circulates downwards to the header 11 via the fin-equipped tubes 9. As the water passes through the tubes 17 it is cooled by the aforementioned evaporative action of the fuel passing through the duct 16, as hereinbefore described, and hence it operates when it flows downwards through the tubes 9 to absorb heat from the air within the body and thus to cool such air. As the result of the continuous flow of cool water through the heat exchange device unit 4 during the operation of the apparatus, the desired cooling of the air in the automobile body is effected and thus the driver and the occupants of the automobile suffer no discomfort during warm or hot weather.

During cold or winter weather when there is no use for the apparatus, the two-way valves 35 and 36 are turned so as to disconnect the heat exchange unit 4 from the cooling device 5 and connect it to the water cooling system for the engine $e$. When the valves are so shifted or manipulated, hot water from the water jacket of the engine flows through the pipe 37 to the header 10 and thence downwards through the tubes 9 to the header 11 and finally back to the circulating system via the pipe connection 38. As a result of the circulation of hot water through the unit 4, the air within the body of the automobile is heated and maintained at a comfortable temperature.

The herein described apparatus is extremely simple in design and hence may be manufactured at a low and reasonable cost. In addition it embodies no parts which are driven directly from the engine and hence does not impart any load on the engine.

Whereas the apparatus has been described in connection with an automobile, it is to be understood that air or other fluid may be employed as the cooling medium for passage through the tubes 17 and also that the invention is not to be restricted to the details set forth since these may be modified within the scope of the appended claims without departing from the spirit and scope of the invention.

Having thus described the invention what I claim as new and desire to secure by Letters Patent is:

1. The combination with an internal combustion engine having an intake manifold and a liquid fuel carburetor for supplying a mixture of air and vaporized fuel to said manifold and also having an engine driven fan wheel for cooling it, of a cooling device comprising a duct between the carburetor and the manifold for the passage of the mixture therethrough and a hollow element associated with and having the hollow thereof separated by a single wall from the interior of the duct and adapted to be cooled as the result of the evaporative action of the mixture passing through said duct, means forming a conduit between the hollow element and a zone to be cooled, and pump means driven by the air emanating from the fan wheel during operation of the engine for flowing a cooling medium under pressure through the element and conduit forming means to said zone.

2. The combination with an internal combustion engine having an intake manifold and a liquid fuel carburetor supplying a mixture of air and vaporized fuel to said manifold and also having an engine driven fan wheel for cooling it, of a cooling device comprising a duct between the carburetor and the manifold for the passage of the mixture therethrough, a hollow element associated with and having the hollow thereof separated by a single wall from the interior of the duct and adapted to be cooled as the result of the evaporative action of the mixture passing through said duct, means forming a conduit between the hollow element and a zone to be cooled, a pump for flowing a cooling medium under pressure through the hollow element and conduit forming means to the one, and a fan wheel connected to drive the pump and positioned in substantial alignment with the engine driven fan wheel so that it is driven by the air emanating from the latter during operation of the engine.

3. The combination with a vehicle having an internal combustion engine with an intake manifold and a liquid fuel carburetor for supplying a mixture of air and vaporized fuel to said manifold, and also having a hood around the engine, of a conduit for conducting air from outside of the hood to the air intake of the carburetor, a cooling device comprising a duct between the carburetor and the manifold for the passage of the mixture therethrough and a hollow element associated with the duct and adapted to be cooled as the result of the evaporative action of the mixture passing through said duct, means forming a conduit between the hollow element and a zone to be cooled, and means for flowing a cooling fluid through the element and conduit forming means to the zone.

JOHN N. MELCHER.